United States Patent [19]

Lee

[11] Patent Number: 4,974,616
[45] Date of Patent: Dec. 4, 1990

[54] REMOVING COATINGS FROM CATHODE RAY TUBES OR PARTS THEREOF

[75] Inventor: Robert A. Lee, Bridgend, Wales

[73] Assignee: Sony Corporation, Tokyo, Japan

[21] Appl. No.: 829,167

[22] Filed: Feb. 14, 1986

[30] Foreign Application Priority Data

Nov. 7, 1985 [GB] United Kingdom ................. 8527489

[51] Int. Cl.$^5$ ................................................ B08B 3/12
[52] U.S. Cl. .......................................... 134/1; 134/3;
134/39; 134/40
[58] Field of Search ........................... 134/1, 3, 40, 39

[56] References Cited

U.S. PATENT DOCUMENTS 3,420,758  1/1969  Scheer ...................................... 134/1

FOREIGN PATENT DOCUMENTS 943652  12/1963  United Kingdom ................... 134/1

*Primary Examiner*—Curtis R. Davis
*Attorney, Agent, or Firm*—Hill, Van Santen, Steadman & Simpson

[57] ABSTRACT

In a method of removing a coating from a cathode ray tube, for example a carbon (graphite) coating on the exterior of a glass body or funnel of the tube, the tube is at least partially immersed in a bath containing an alkaline liquor such that at least the coating is immersed in the liquor, and the liquor is subjected to ultrasonic excitation, for example by transducers disposed in the liquor in the bath.

8 Claims, 2 Drawing Sheets

REMOVING COATINGS FROM CATHODE RAY TUBES OR PARTS THEREOF

BACKGROUND OF THE INVENTION

1. Field of the Invention

This invention relates to removing coatings from cathode ray tubes, for example cathode ray tubes intended to act as picture tubes of television receivers, or parts of such tubes.

2. Description of the Prior Art

Cathode ray tubes (CRTs) intended to act as picture tubes of color television receivers conventionally are constructed by various different manufacturers in a manner that will now be described with reference to FIG. 1 of the accompanying drawings. The CRT is formed from a funnel-like glass body 10, referred to hereinafter more simply as a "funnel", and a glass face plate or panel 12. A metal electrode member 14, known as an anode button, extends through the wall of a main body portion 18 of the funnel 10 and is sealed in a vacuum-tight manner to the glass making up the wall.

To make the CRT, a carbon (graphite) coating (not shown) is applied to the interior of the funnel 10. The composition of the internal graphite coating may vary as between the main body portion 18 and a neck portion 20 which is designed to accommodate an electron gun (not shown). The funnel 10 then is heated in an oven so that the internal carbon coating will cure or set.

The funnel 10 then is joined to the panel 12, the interior of the panel previously having been coated in respective local areas with one or more phosphors, its own carbon (graphite) coating and, in some instances, aluminum. The funnel 10 is joined to the panel 12 by applying an adhesive to an end edge 22 of the funnel and/or to an edge 24 of the panel 12 so that the edges 22 and 24 are joined together by the adhesive. The adhesive comprises a frit and a binder liquid and, after it has been applied, the assembly of the funnel 10 and panel 12 is heated so that the adhesive will cure or set to firmly bond together the funnel 10 and panel 12 in such a manner as to provide a vacuum-tight seal between them.

Thereafter, the funnel 10 is evacuated and, whilst it is evacuated, the electron gun (not shown) is sealingly fitted into the neck portion 20 of the funnel and the flared end part of the neck portion is removed. Also, a carbon (graphite) coating (not shown) is applied to at least part of the exterior of the main body portion 18 of the funnel 10. The exterior graphite coating may be of a different composition to that or those on the interior of the funnel 10.

The carbon coatings as applied to the inside and outside of the funnel 10 all comprise carbon (graphite) in a liquid binder and can be applied to the respective portions of the funnel by spraying or rolling, after which they are cured or set by heating. As is known to these skilled in the art of CRT manufacture, the various different coatings are available in liquid form from specialist suppliers, for instance from Acheson Colloids under the trademark "ELECTRODAG". The precise composition of the various carbon coatings will be determined by various factors, including the size of the CRT and its intended quality. By way of example, however, the coating as applied to the interior of the main body portion 18 of the funnel 10 may be (in parts by weight): 22% graphite, 10% potassium silicate and 68% water; while that applied to the interior of the neck portion 20 may be: 1 kg of graphite and 220 g of silicon carbide to 750 ml of water glass.

It sometimes happens that, for one reason or another, a CRT manufactured by the method just described will be found to be defective. For example, the seal formed by the adhesive joining together the funnel 10 and panel 12 may be defective so that a vacuum cannot be maintained in the CRT. Instead of throwing away the tube, many manufacturers will, in this event, try to salvage the funnel 10 and/or the panel 12 by separating them, whereupon the salvaged component can be reintroduced into the manufacturing process at a suitable stage and used in making another CRT.

The salvaged funnel 10 and/or panel 12 must be stripped of its coatings before it can be used. That is to say, the carbon (graphite) coatings must be removed from the interior and exterior of the funnel 10 and/or the carbon, phosphors and aluminum must be removed from the panel 12. According to a technique used by several manufacturers, the carbon coatings of the funnel 10, which are soluble in hydrofluoric acid (HF), are removed by spraying the interior and exterior of the funnel with HF. This technique has the disadvantages that it is time consuming (the HF taking about 20 minutes or so to remove the coatings), and that HF is both expensive and, by virtue of its corrosive nature, difficult and dangerous to handle.

In some cases, a manufacturing defect may be rectified without disassembling the funnel 10 and panel 12 from one another. For example, the carbon coating on the exterior of the funnel 10 of a completed CRT may be found to be defective, in which case that coating only needs to be removed and the CRT then can be put back on to the production line at an appropriate stage for a fresh external carbon coating to be applied. However, before this is done, the old (defective) coating must be removed. Alternatively, the electron gun of a completed tube may be found defective, in which case the tube is let down to air (that is, the vacuum is released), the gun is removed, a tubular piece of glass is welded to the end part of the neck portion 20 of the funnel 10, a new gun is fitted and the CRT can then be put back on the production line at an appropriate stage. Again, before the CRT is put back on the production line, the carbon coating on the exterior of the funnel must be removed. In either of the cases mentioned above, the external carbon coating can be removed by hand by scrubbing it off with wire wool and warm water. This is a time consuming process, taking typically about 7 to 8 minutes. Since the operation is performed by hand, it cannot be performed within a protective enclosure, whereby there is a risk of injury to the operator should the CRT accidentally be smashed during the course of the process. This danger is more acute if the operation is performed with the tube under vacuum, since smashing of the tube will in this event cause an implosion. (It will of course be appreciated that the tube is always under vacuum in the event that all that is required is the replacement of a defective external carbon coating. Further, even if a gun is to be replaced, it is in general preferable for the carbon coating to be removed before the coating is let down to air in order to reduce the possibility of any containment, for example the water used in the scrubbing process, from entering the CRT).

SUMMARY OF THE INVENTION

An object of the invention is to provide a method of removing a coating from a cathode ray tube or a part thereof which is quicker than the prior art methods mentioned above.

Another object of the invention is to provide a method of removing a coating from a cathode ray tube or a part thereof which avoids the need to use hydrofluoric acid.

A further object of the invention is to provide a method of removing a carbon coating from the exterior of a cathode ray tube which need not be performed by hand, thereby enabling danger to the operator to be minimized.

The invention provides a method of removing a coating from a cathode ray tube or a part thereof, the method comprising at least partially immersing the tube or the part thereof in a bath containing an alkaline liquid such that at least the coating is immersed in the liquid and subjecting the alkaline liquid in the bath to ultrasonic excitation so as to remove the coating from the tube or part thereof.

I have ascertained that various coatings applied to CRTs and parts thereof are soluble in alkaline liquids, and that ultrasonically exciting the alkaline liquids can remove the coatings from the cathode ray tubes or parts thereof surprisingly quickly. In spite of the fact that an alkaline liquid (for example sodium hydroxide - NaOH) is used instead of HF, which is known to be highly corrosive, the ultrasonic excitation has such an enhancing effect on the corrosive effect of the alkali that the time taken to remove carbon coatings from the inside and outside of the body or funnel of a CRT, for example, can be reduced from the above-quoted figure of about 20 minutes to around one to two minutes, even less. Clearly, the reduction in processing time leads to the possibility of considerable savings in costs. Also, the fact that alkaline liquids are in general cheaper than HF can lead to further costs savings. Further, alkaline liquids generally are more easily available than HF and are less difficult and dangerous to handle.

As indicated above, methods embodying the invention can be used in place of the known HF removal technique described above to remove carbon coatings from the interior and exterior of a glass body or funnel of a CRT. It has been found that they can also be used to remove phosphor and carbon coatings (and aluminum coatings) from a glass panel of a CRT. Further they can be used to remove an external carbon coating from the funnel of a whole CRT, in place of the wire wool manual technique described above. Not only can this greatly reduce the removal time, but the risks associated with the manual removal technique can be removed.

Although various alkalis can be used, the alkaline liquid preferably comprises sodium hydroxide, which is cheap and easily available and is believed to have no long term adverse effects on the glass used in CRT manufacture.

It is within the scope of the invention for the ultrasonic excitation to be effected by one or more transducers disposed outside of the bath. Preferably, however, in order to maximize the degree of agitation of the alkaline liquid obtained per unit amount of power applied to the transducer or transducers, that is to maximize the extent to which the applied power is coupled to the CRT or part thereof, the ultrasonic excitation is effected by means of at least one transducer that is disposed within the alkaline liquid within the bath or forms part of a wall of the bath. In this connection it should be noted that the transducer(s) may be encased in a material (for example stainless steel) that will withstand attack from alkalis such as NaOH (but not attack from HF) for a sufficiently long period of time as not to require such frequency replacement of the transducer heads as would make the method uneconomical.

In broad accordance with the way in which it is used in the art, the term "cathode ray tube" (or "CRT") as used herein is to be interpreted broadly as meaning any enclosure or envelope (which may or may not be of tubular shape) which has at least one carbon and/or phosphor and/or aluminum or other coating thereon and which contains or is intended to contain an electron gun or other charged particle source for generating one or more beams of electrons or other charged particles for display purposes. Thus, although the invention is described herein by way of example with particular reference to CRTs intended to act as picture tubes of color television receivers, the invention is applicable to CRTs of various other types, including (for instance) certain special purpose CRTs which are disassembled as a matter of routine for servicing and/or re-building. More specifically, without prejudice to the generality of the foregoing, the invention is applicable for instance to CRTs of the following types.

1. Shadow mask or similar tubes intended usually for use as picture tubes for domestic television receivers and the like, for example tubes of the TRINITRON (trade mark) kind.
2. Beam index color tubes and envelopes.
3. Monochromatic tubes and envelopes.
4. Penetration phosphor tubes and envelopes.
5. Field sequential color filter tubes and envelopes.
6. Dark trace color filter tubes and envelopes.
7. Flat evacuated color/monochromatic tubes and envelopes.
8. Plasma discharge tubes and envelopes.
9. All glass and metal tubes and envelopes.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
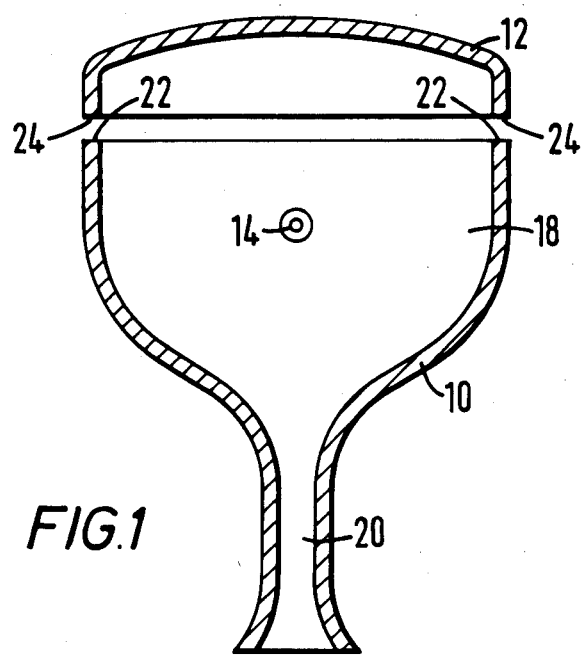
FIG. 1 shows a cathode ray tube (CRT), more specifically a CRT intended to form a picture tube for a color television receiver, in the course of construction.

A method embodying the invention for removing the carbon coating from the exterior of the funnel 10 of a CRT of the kind described above with reference to FIG. 1 will now be described with reference to FIGS. 2 and 3. In practice, a batch of several CRTs may be treated simultaneously. For simplicity, however, the treatment of only one CRT will be described.

The CRT is disposed as shown in a bath 30 containing an alkaline liquor 32 so that at least the external carbon coating on the funnel 10 is immersed in the liquor. The CRT is supported in position by suitable support means (not shown). As shown, the neck portion 20 of the CRT is sealed and therefore the interior of the CRT cannot be penetrated by contaminants such as the alkaline liquor. The liquor 32 may comprise, for example, in parts by volume: 55% NaOH; 5 to 10% sodium carbon ($Na_2CO_3$) and the rest water. The $Na_2CO_3$ acts essentially as a detergent to help free particles of the coating removed by the corrosive action of the NaOH.

A plurality of piezoelectric transducer heads 34 are immersed in the liquor 32 in the bath 30 and are connected via a multiplexer (not shown) to an ultrasonic frequency generator (not shown) so that, when energized, they subject the liquor 32 to ultrasonic excitation. The transducer heads 34 are encased in stainless steel, since it has been ascertained that stainless steel will withstand the corrosive effect of alkalis such as NaOH for a long time, whereas if HF were used the transducer heads would be destroyed so quickly as to make the cleaning method uneconomical. Preferably, as shown, the transducer heads 34 are disposed so as to approximately equal insonify the different parts of the external surface, maximum emanation of ultrasound preferably occurring from the faces of the heads 34 that confront the CRT. Specifically, in the illustrated arrangement, at least one respective transducer head 34 is disposed along and facing each of the four sides of the CRT, the arrangement preferably comprising, as shown, a plurality of such groups of four transducers corresponding approximately to the outline of the exterior of the funnel. The destructive (corrosive) effect of the alkaline liquor 32 on the carbon coating is intensified or speeded up greatly by the ultrasonic agitation of the liquor so that the coating quickly is destroyed. After a predetermined period of time sufficient to ensure removal of the coating, the CRT is lifted out of the bath 30. The period of time employed will depend upon a number of factors, including the size of the tube, the nature of the carbon coating, the positioning of the transducer heads 34 and the amount of ultrasonic power employed. Laboratory tests have shown a period of a few minutes to be adequate. However, these tests used low power transducers which were not arranged optimally with respect to the funnel 10. In a full scale apparatus, it is expected that the total processing time will be less than this figure, possibly around one to two minutes or even less.

The amount of ultrasonic power generated appears not to be critical. Generally speaking, within reasonable limits, the power is made as high as possible in order to promote quick destruction of the coating.

Tests have shown that an ultrasonic frequency of 45 kHz is satisfactory. However, the frequency appears not to be critical, so that other frequencies can be employed.

Figure 2:
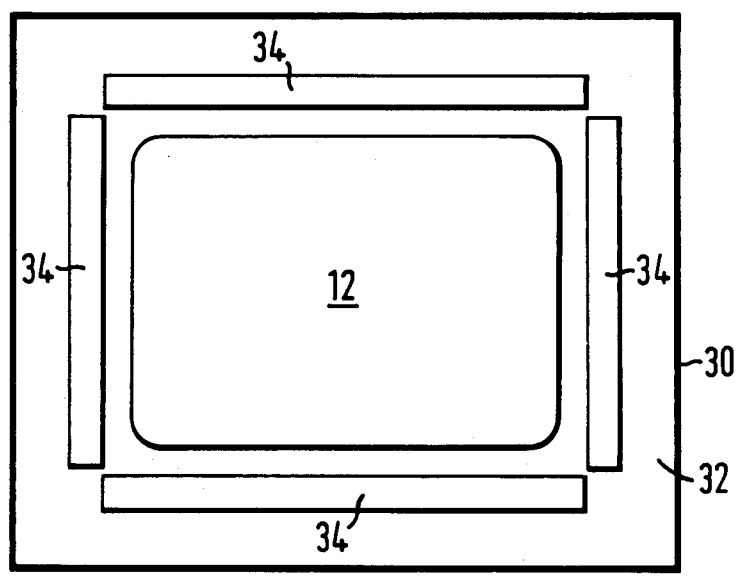
FIG. 2 is a schematic plan view from above of a CRT disposed in a bath containing an alkaline liquor.
Figure 3:
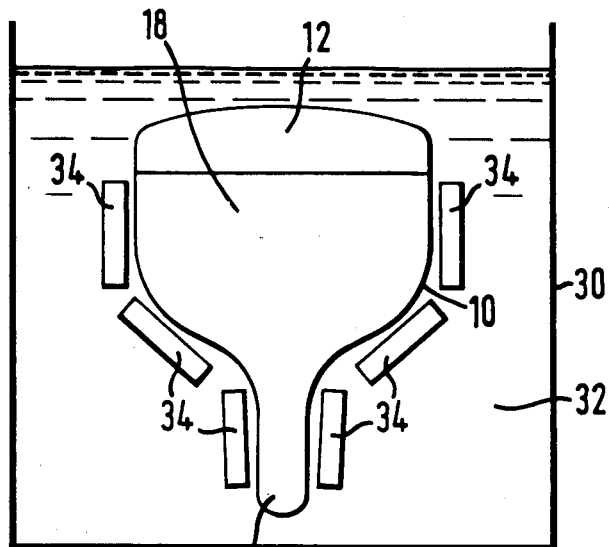
FIG. 3 is a schematic side sectional view of the CRT disposed in the alkaline liquor bath.

The CRT does not need to be oriented in the bath 30 in the position shown in FIGS. 2 and 3. It could, for example, be positioned the other way up. Neither is it necessary for the CRT to be fully immersed: it is sufficient that the carbon coating on the exterior of the funnel 10 be immersed.

The transducer heads 34 are, as indicated above, preferably positioned so as to cause ultrasonic agitation of the liquor 32 approximately equally over the exterior of the funnel 10. However, the method would still function, albeit perhaps less efficiently, using one or more transducer heads positioned elsewhere in the bath, forming part of a wall or walls of the bath, or even positioned outside of the bath.

Once the carbon coating has been removed from the exterior of the funnel 10 of the CRT by the method described with reference to FIGS. 2 and 3, the CRT is rinsed and then is ready for further processing. It can, for example, be placed back on the production line for a new carbon coating to be applied. Alternately, if its electron gun needs to be replaced, it can be let down to air and the gun replaced in the manner described above.

As indicated above, methods embodying the invention can be employed also to remove the carbon (graphite) coatings from the exterior and interior of the funnel 10 after it has been separated from the panel 12. Such separation can be effected by a method known in the art, according to which a combination of nitric acid and thermal shock is employed to destroy the adhesive that bonds together the funnel 10 and the panel 12. Preferably, however, the separation is effected by a method which is described and claimed in my copending UK Patent Application No. 8527488 filed Nov. 7, 1985 and in my corresponding copending U.S. patent application Ser. No. 829,161 which was filed on the same date as the present application and is now U.S. Pat. No. 4,952,185, the disclosure of which is hereby incorporated herein by reference.

An example of how the carbon (graphite) coatings can be removed from the exterior and interior of the funnel 10 of the CRT will now be described with reference to FIG. 4. After it has been separated from the panel 12 and rinsed, the funnel 10 is immersed fully, as shown, in a bath 30 containing an alkaline liquor 32 which can be the same as or similar to the bath 30 and liquor 32 of FIGS. 2 and 3. Preferably (but not essentially), as shown, the lower end of the neck portion 18 of the funnel and the electron gun previously have been removed. As in the case of FIGS. 2 and 3, the bath 30 contains transducer heads 34 which preferably are disposed so as to approximately equally insonify the different parts of the funnel 10. The destructive (corrosive) effect of the alkaline liquor 32 on the carbon coatings is intensified by the ultrasonic agitation of the liquor so that the coatings are removed quickly, possibly in around one to two minutes. The funnel is then removed from the bath 30 and rinsed. Then, after welding on a new lower end part of the neck portion 18, it is ready to be put back on the production line to be used in making another CRT.

The inside and outside of the anode button 14 can be protected by push-on plastic covers (as used in the known HF process) while the funnel 10 is immersed in the liquor 32. However, since the corrosive effect of the liquor 32 on the anode button 16 is likely to be minimal, in view of the short treatment time, the use of such covers may not in practice be necessary.

Figure 4:
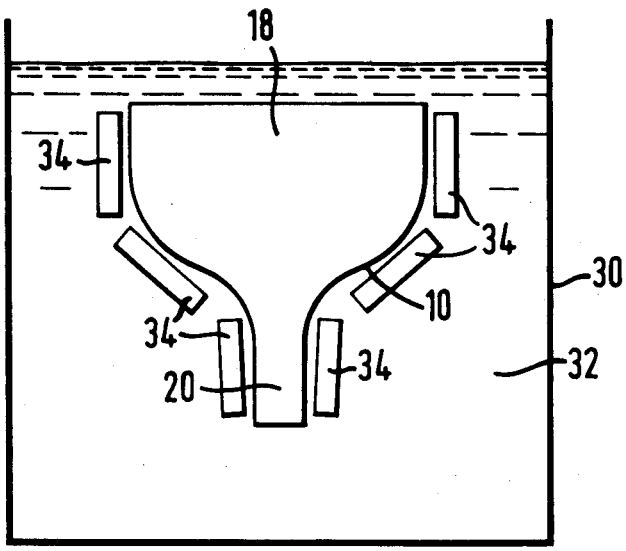
FIG. 4 is a schematic side section view of a funnel of the CRT disposed in an alkaline liquor bath.

The method of FIG. 4 can be varied in similar manner to that of FIGS. 2 and 3. Thus: the amount of ultrasonic power employed is preferably as high as possible; the frequency can be 45 kHz, though this is not critical; the funnel 10 can be oriented in the bath 40 in any desired way; and one or more of the transducer heads 34 can be positioned in other positions than these shown, elsewhere in the bath 30, forming part of a wall or walls of the bath, or even outside of the bath.

A method similar to that described with reference to FIG. 4 can be used to clean the panel 12. In this connection, it has been found that an ultrasonically excited alkaline liquor will also remove the phosphor, aluminum and carbon (graphite) coatings on the panel 12.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of removing a coating from a cathode ray tube, the method comprising at least partially immersing said cathode ray tube in a bath containing an alkaline liquid comprising approximately 55% by volume sodium hydroxide, 5 to 10% sodium carbonate and the balance water such that at least said coating is immersed in the liquid and subjecting the alkaline liquid in said bath to ultrasonic excitation effected by means of a plurality of transducers so disposed within said alkaline liquid as to approximately equally insonify a portion of said cathode ray tube bearing said coating so as to remove said coating from said tube.

2. A method according to claim 1, which is used to remove a carbon coating from the exterior of a glass body of said cathode ray tube.

3. A method according to claim 1, wherein said ultrasonic excitation is effected by means of at least one transducer that forms part of a wall of said bath.

4. A method of removing a coating from a part of a cathode ray tube, the method comprising at least partially immersing said part of said cathode ray tube in a bath containing an alkaline liquid comprising approximately 55% by volume sodium hydroxide, 5 to 10% sodium carbonate and the balance water such that at least said coating is immersed in the liquid and subjecting the alkaline liquid in said bath to ultrasonic excitation effected by means of a plurality transducers so disposed within the alkaline liquid so as to approximately equally insonify a portion of said part of said cathode ray tube bearing said coating so as to remove said coating from said part of said cathode ray tube.

5. A method according to claim 4, which is used to remove carbon coatings from the exterior and interior of a glass body of said cathode ray tube.

6. A method according to claim 4, which is used to remove a carbon coating from a glass panel of said cathode ray tube.

7. A method according to claim 6, which is used also to remove a phosphor coating from said glass panel.

8. A method according to claim 6, which is used also to remove an aluminum coating from said glass panel.

* * * * *